(12) United States Patent
Doorandish

(10) Patent No.: US 10,015,655 B2
(45) Date of Patent: Jul. 3, 2018

(54) SMART PATIO HEATER DEVICE

(71) Applicant: Seyed Mehdi Doorandish, Woodland Hills, CA (US)

(72) Inventor: Seyed Mehdi Doorandish, Woodland Hills, CA (US)

(73) Assignee: Seyed Mehdi Dooranoish, Canoga Park, CA (US)

( * ) Notice: Subject to any disclaimer, the term of this patent is extended or adjusted under 35 U.S.C. 154(b) by 57 days.

(21) Appl. No.: 15/378,071

(22) Filed: Dec. 14, 2016

(65) Prior Publication Data

US 2017/0108227 A1  Apr. 20, 2017

Related U.S. Application Data

(60) Provisional application No. 62/267,103, filed on Dec. 14, 2015.

(51) Int. Cl.
| | |
|---|---|
| *F21S 8/08* | (2006.01) |
| *F21S 9/02* | (2006.01) |
| *F24C 3/14* | (2006.01) |
| *G06F 3/16* | (2006.01) |
| *G06Q 30/06* | (2012.01) |
| *G06Q 50/12* | (2012.01) |
| *H02J 7/00* | (2006.01) |
| *H04W 4/00* | (2018.01) |

(Continued)

(52) U.S. Cl.
CPC .............. *H04W 4/80* (2018.02); *F21V 29/90* (2015.01); *F24C 1/12* (2013.01); *F24C 3/042* (2013.01); *G06F 3/165* (2013.01); *G06Q 30/0641* (2013.01); *G06Q 50/12* (2013.01); *H02J 7/0013* (2013.01); *H05B 33/0845* (2013.01); *F21S 8/08* (2013.01); *F21S 9/02* (2013.01); *F21V 33/0092* (2013.01); *F21W 2131/10* (2013.01); *F21Y 2115/10* (2016.08)

(58) Field of Classification Search
CPC ...... F21S 9/00; F21S 9/02; F21S 19/00; F21S 8/08; F24C 1/08; F24C 1/10; F24C 1/12; F24C 3/042; G06C 30/0641; G06C 50/12; H02J 7/0013; F21W 2131/10; F21W 2131/109; F21W 2131/1005; F21W 2131/109; F21V 29/90; F21V 33/0092
USPC .............................. 362/92; 62/238.2; 60/648
See application file for complete search history.

(56) References Cited

U.S. PATENT DOCUMENTS

| | | | |
|---|---|---|---|
| 7,086,396 B2 * | 8/2006 | Waters ...................... | F24C 1/12 126/92 AC |
| 9,171,419 B2 * | 10/2015 | Dion ..................... | G07F 17/305 |

(Continued)

*Primary Examiner* — Alan Cariaso

(57) ABSTRACT

The embodiments herein provide a smart patio heater device comprising a base having vertically extending chamber for receiving a gas from tank to supply gas to a gas burning area for generating heat which is dissipated in all directions or to a user desired area. The thermoelectric generators (TEG) are affixed over the burning area for generating electric power from the heat. The generated power is provided to a central processing system and stored in the batteries for later use. A water pipe connected between a water storage unit and TEG unit at is encircled around chamber and passed through the post. The water is circulated within the water pipe to absorb the excess heat generated around the TEG unit to prevent overheating. The electronic devices are provided to derive electrical power from the batteries for providing additional functions to the user.

19 Claims, 11 Drawing Sheets

(51) Int. Cl.

| | |
|---|---|
| *H05B 33/08* | (2006.01) |
| *H05K 7/20* | (2006.01) |
| *F21V 33/00* | (2006.01) |
| *H04W 4/80* | (2018.01) |
| *F21V 29/90* | (2015.01) |
| *F24C 1/12* | (2006.01) |
| *F24C 3/04* | (2006.01) |
| *F21Y 115/10* | (2016.01) |
| *F21W 131/10* | (2006.01) |

(56) References Cited

U.S. PATENT DOCUMENTS

| | | | |
|---|---|---|---|
| 2004/0177843 A1* | 9/2004 | Bernini | F24C 1/12 |
| | | | 126/92 AC |
| 2009/0223512 A1* | 9/2009 | Konkle | F24C 1/10 |
| | | | 126/92 AC |
| 2010/0101621 A1* | 4/2010 | Xu | C09K 5/063 |
| | | | 136/206 |
| 2015/0201805 A1* | 7/2015 | Cedar | A47J 37/0754 |
| | | | 126/25 R |

* cited by examiner

SMART PATIO HEATER DEVICE

BACKGROUND

Technical Field

The embodiments herein are generally related to the field of outdoor space heaters. The embodiments herein are particularly related to portable heating apparatus. The embodiments herein are more particularly related to outdoor patio heaters for providing heat in all directions or in a specific area desired by the user.

Description of the Related Art

Traditionally outdoor patio heaters are commonly used for places such as restaurants and outdoor recreational facilities to provide warmth in preselected outdoor areas thereby making it much more comfortable for those who like to be outdoors. The use of patio heaters helps to extend the working hours of the day in cold seasons during which it becomes difficult to enjoy outdoor activities comfortably due to chilled weather conditions. Patio heaters typically comprise a base chamber that is sized to contain a fuel tank therein and a post connected to the base chamber projecting upward there from to a burner assembly housing in which air is heated by combustion of the fuel gases from the tank in the base chamber.

These typical patio heaters provide heat in all directions and thus a lot of heat is wasted from the top surface which reduces the efficiency of the heater. In addition, the currently available patio heaters are all manually operated thereby requiring the party managers or owners of the restaurants to continuously monitor the starting or shutting down operations of the device depending on the presence of customers in that particular area of the restaurant.

Moreover, the patio heaters are used for outdoor areas or party locations where there is a frequent need to deploy additional electronic devices such as LED light, music systems, food ordering kiosks and the like. Thus, a management of these many devices along with the monitoring of their power supply creates an additional burden for the party managers. Arranging power supply for different electronic devices leads to laying of long wires from one area to another of the outdoor facility which in turn many a times results in user being tripped over these wires.

Hence, there is a need for a heating apparatus such as a patio heater to maximize the heating efficiency by providing heating in a desired direction. Yet there is a need for a patio heater which makes use of the heat wasted from the top portion by converting the waste heat into useful electrical energy for driving several other electronic devices. Further, there is a need for a patio heater which provides heating based on a detection of a presence of user around the device thereby saving a remarkable amount of fuel consumption and manual effort. Still further, there is a need for a smart outdoor patio heater which houses several other electronic devices such as music system, food ordering kiosk, lighting system, etc., operated along with the patio heater.

The above mentioned shortcomings, disadvantages and problems are addressed herein and which will be understood by reading and studying the following specification.

OBJECTS OF THE EMBODIMENTS

The primary object of the embodiments herein is to provide a patio heater or portable outdoor space heater which maximizes the heating efficiency by providing heat in a desired direction.

Another object of the embodiments herein is to provide a patio heater which makes use of the heat wasted from the top portion and converts the heat from top portion into useful electrical energy for driving several other electronic devices.

Yet another object of the embodiments herein is to provide a patio heater which provides heating only based on a detection of presence of a user presence around the device thereby saving a remarkable amount of fuel consumption and manual effort.

Yet another object of the embodiments herein is to provide a smart outdoor patio heater which houses several other electronic devices such as music system, food ordering kiosk, lighting system, etc., operated along with the patio heater.

Yet another object of the embodiments herein is to develop portable patio heater device provided with two thermoelectric generator (TEG) units located at a top layer of the smart patio heater for converting the heat generating from gas into electricity.

Yet another object of the embodiments herein is to develop portable patio heater device provided with a radiator or heat-sink to disperse and cool off the TEG unit from overheating during the operation.

Yet another object of the embodiments herein is to develop portable patio heater device provided with a central processing system (CPS) driven by the electrical energy generated from the TEG unit for storing the electrical energy into one or more batteries to drive a plurality of electronic devices.

Yet another object of the embodiments herein is to develop portable patio heater device provided with four wheels at the bottom for movement in multiple directions thereby moving the patio heater to a desired location.

Yet another object of the embodiments herein is to develop portable patio heater device provided with a breaking system for securing the patio heater unit at a fixed location through a breaking pad to prevent any fire danger to the user of the smart patio heater.

Yet another object of the embodiments herein is to develop portable patio heater device provided with water storage unit which is located at the base chamber of the patio heater and connected to both TEG units through a water pipe for supplying water to the TEG units for cooling off to prevent an overheating of the TEG units.

Yet another object of the embodiments herein is to develop portable patio heater device provided with a water pipe positioned or embedded around, inside, and behind the entire surface of base of the patio heater for providing additional heat to the surface of the base to provide additional warmth for users who lean against the heater surface while sitting near the base of the smart patio heater.

Yet another object of the embodiments herein is to develop portable patio heater device provided with a set of pre-programmed LED lights to surround the middle section of the patio heater for decorative purposes or for providing lights for reading or other purposes as desired by user.

Yet another object of the embodiments herein is to develop portable patio heater device provided with one or more 110 v/USB outlets to enable the users to charge various small electronic devices such as phones, music player and the like.

Yet another object of the embodiments herein is to develop portable patio heater device provided with Bluetooth wireless speakers that are located inside of the patio heater base for allowing the user to broadcast music individually or collectively through a network of the smart patio heaters.

Yet another object of the embodiments herein is to develop portable patio heater device provided with one or more motion/PIR/Ultrasonic sensors at the middle section of the patio heater for sensing a presence of a user presence around the patio heater device and to ensure safety during the operation of the patio heater device by preventing fire as well as saving gas from purposeless burning.

Yet another object of the embodiments herein is to develop portable patio heater device provided with a wireless (Wi-Fi/Bluetooth) communication board housed inside of the base chamber of the patio heater device for acting a bridge/interface between the patio electronic devices and the control application on a smart phones or smart devices.

Yet another object of the embodiments herein is to develop portable patio heater device provided with a software application hosted on the smart phone of the user for single or multiple patio heaters to control the device individually or collectively through a network at locations/places like restaurants, events, or large area outdoor recreational facilities where multiple heaters are required.

Yet another object of the embodiments herein is to develop portable patio heater device provided with to provide a food ordering kiosk with a touch screen pad for viewing the restaurant's menu and for ordering food or drinks electronically.

Yet another object of the embodiments herein is to provide a portable smart patio heater device which is installed/retrofit on the existing patio heaters to provide additional benefits from the same features offered by the smart patio heater to the users of existing patio heaters.

Yet another object of the embodiments herein is to develop portable patio heater device provided with a cooling system through the use of thermoelectric cooler (TEC).

Yet another object of the embodiments herein is to develop portable patio heater device provided with a set of fans powered by the one or more batteries and controlled by the CPS for actively blowing the hot or cooled air to the user in addition to the ambient heat generated elsewhere.

Yet another object of the embodiments herein is to develop portable patio heater device provided with a fan located at the bottom of the patio heater unit for blowing the heat from the radiator downward and outward towards the user's feet, thereby providing an additional heat source.

Yet another object of the embodiments herein is to develop portable patio heater device provided with a set of solar panels located at the top and bottom part of the patio heater unit for providing supplemental power for charging one or more batteries.

Yet another object of the embodiments herein is to develop portable patio heater device provided with a built-in liquid propane (LPG) power generator for providing a backup power source for cooling.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide a smart portable patio heating system. The system comprises a patio heater device. The device comprises a base having a vertically extending chamber configured for receiving a gas tank for supplying gas for generating heat by burning the gas at a burning area situated over a post extending from the chamber. The burning area is configured for dissipating the generated heat in all directions or to a specific area desired by the user. The device also comprises one or more thermoelectric generator (TEG) units affixed over the burning area and configured for generating electric power from the heat generated by burning the gas. The generated electric power is provided to a central processing system situated within the chamber for storing the generated electric power in one or more batteries for later use. The device further comprises a water pipe encircled around the chamber from within and passes through the post. The water pipe is connected to a water storage unit available within the chamber at the one end and the TEG unit at another end. The water circulating within the water pipe absorbs the excess heat generated around the TEG unit and avoids overheating of TEG unit. The heated water circulating through the water pipe dissipates the heat evenly across the surface area of the patio heater device for providing additional warmth to the user sitting next to the device. The device still further comprises a set of electronic devices that are configured to derive an electrical power from the one or more batteries charged through the central processing system for providing additional benefits or functionality/functions to the user.

According to an embodiment herein, the dissipation of the generated heat in a specific area desired by the user is controlled by blocking the output of gas to the unwanted area where heat is not desired. The blocking of the output gas to the unwanted area is controlled by a control switch attached to the post.

According to an embodiment herein, the device further comprises a radiator coupled to the TEG unit and configured for dispersing and cooling off the TEG unit from overheating during the operation.

According to an embodiment herein, the device further comprises a digital pressure sensor located at the top of the gas tank and configured for informing/indicating or notifying the remaining gas volume in the device to the user by determining/estimating the pressure level of the liquid gas.

According to an embodiment herein, the device further comprises a regulator and a programmable valve control along with digital pressure sensor configured for allowing the user to control the gas flow remotely via computing device of the user.

According to an embodiment herein, the device further comprises four wheels fixed at the bottom surface of the base and configured for moving/transporting the patio heater device freely in multiple directions to a desired location. The wheels comprise a breaking system with breaking pads for positioning the patio heater device at one/given/desired location.

According to an embodiment herein, the set of electronic devices deriving power from the one or more batteries charged through central processing system include one or more pre-programmed LED lights affixed on the post for decoration, and reading lights for reading purpose. The intensity of the LED lights and reading lights are controlled by the user using a dimmer knob affixed on the post.

According to an embodiment herein, the device further comprises a wireless communication board deployed within the central processing system and configured for allowing the user to control the operation of the set of electronic devices remotely through the computing device of the user.

According to an embodiment herein, the device further comprises one or more power outlets configured for providing power to one or more electronic devices of the user positioned externally. The electronic devices include smartphones, tablets, laptops, music players and the like. The power is provided from the one or more batteries charged through the central processing system.

According to an embodiment herein, the device further comprises a wireless speaker deployed as an electronic device deriving power from the central processing system and configured for playing music based on a request received from the user. The wireless speaker is further configured for allowing the user to broadcast the music to a single patio heater device or to a network of patio heater devices.

According to an embodiment herein, the central processing system is further configured for holding the patio heater device in standby or shut-off mode after being used for pre-defined time duration for increasing the device efficiency. The pre-defined time duration is configurable by the user through the computing device.

According to an embodiment herein, the device further comprises a proximity/motion sensor attached to the post and configured for detecting the proximity of the user near the patio heater device and for restarting the patio heater device from standby or shutoff mode upon detecting user presence.

According to an embodiment herein, the device further comprises a smart food ordering kiosk with a touch screen pad for viewing the restaurant's menu and for ordering food or drinks electronically.

According to an embodiment herein, the device further comprises hosting a software application on the computing device of the user for controlling the operation of a single or multiple smart patio heater devices individually or collectively via a network.

According to an embodiment herein, the smart patio heater device is further configured for installing on or retrofit with the existing patio heater devices for providing additional features/functions offered by the smart patio heater when installed on the existing patio devices.

According to an embodiment herein, the device further comprises a set of solar panels located at the top and bottom part of the smart patio heater device for providing supplemental power for charging the one or more batteries.

According to an embodiment herein, the device further comprises a fan assembly placed near the top of the patio heater device, deriving power from the one or more batteries and controlled by the CPS for blowing the heated or cooled air to the user. The fan assembly comprises an additional fan located at the bottom of the patio heater device configured for acting as an additional heat source for blowing the heat from the radiator in downward and upward directions towards the user's feet.

According to an embodiment herein, the device further comprises one or more thermoelectric cooler (TEC) units configured for generating temperature gradient upon applying differential current across the TEC units. The cooler front of the temperature gradient is configured for cooling the water within the water pipe. The cold water is passed through a high pressure nozzle for generating cold mist that is mixed with air and is blown out to the user through the fan assembly.

According to an embodiment herein, the device further comprises a liquid propane power generator configured for acting as a backup power source. The power generator charges the one or more batteries to a specific level when the residual battery charge reduces/falls below a specified threshold.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Figure 1:
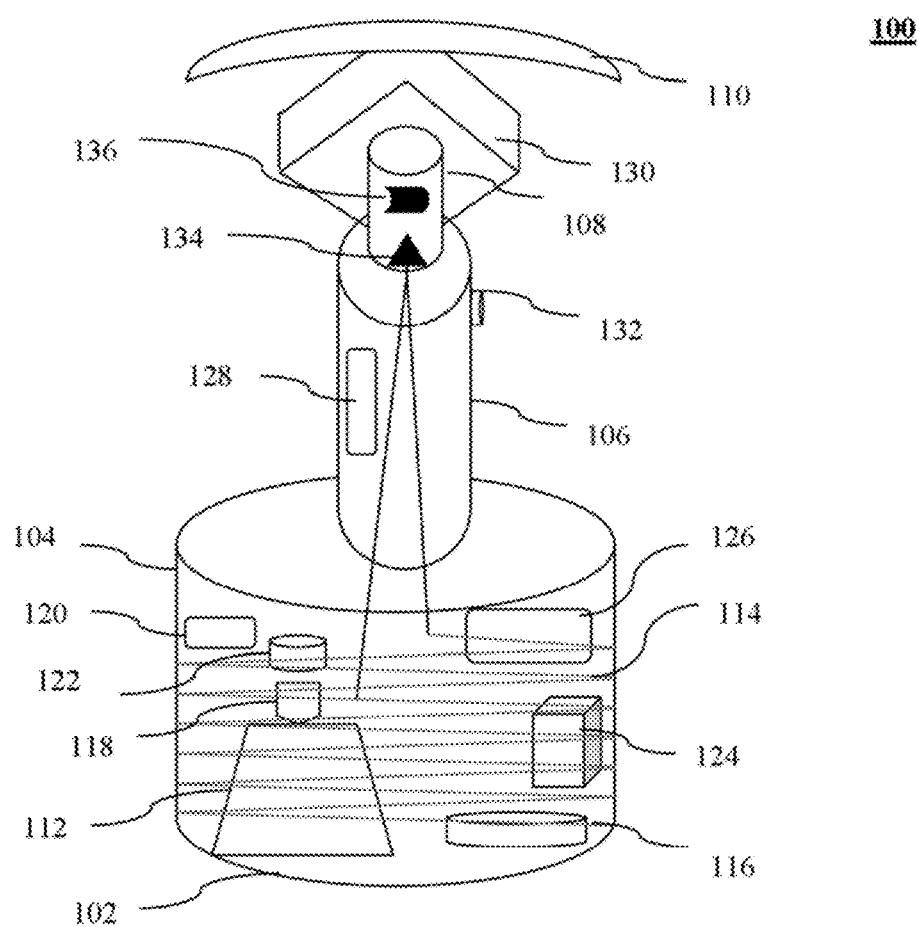
FIG. 1 illustrates a perspective view of the smart patio heater device, according to one embodiment herein.

Although the specific features of the present invention are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a smart portable patio heating system. The system comprises a patio heater device. The device comprises a base having a vertically extending chamber configured for receiving a gas tank for supplying gas for generating heat by burning the gas at a burning area situated over a post extending from the chamber. The burning area is configured for dissipating the generated heat in all directions or to a specific area desired by the user. The device also comprises one or more thermoelectric generator (TEG) units affixed over the burning area and configured for generating electric power from the heat generated by burning the gas. The generated electric power is provided to a central processing system situated within the chamber for storing the generated electric power in one or more batteries for later use. The device further comprises a water pipe encircled around the chamber from within and passes through the post. The water pipe is connected to a water storage unit available within the chamber at the one end and the TEG unit at another end. The water circulating within the water pipe absorbs the excess heat generated around the TEG unit and avoids overheating of TEG unit. The heated water circulating through the water pipe dissipates the heat evenly across the surface area of the patio heater device for providing additional warmth to the user sitting next to the device. The device still further comprises a set of electronic devices that are configured to derive an electrical power from the one or more batteries charged through the central processing system for providing additional benefits or functionality/functions to the user.

According to an embodiment herein, the dissipation of the generated heat in a specific area desired by the user is controlled by blocking the output of gas to the unwanted area where heat is not desired. The blocking of the output gas to the unwanted area is controlled by a control switch attached to the post.

According to an embodiment herein, the device further comprises a radiator coupled to the TEG unit and configured for dispersing and cooling off the TEG unit from overheating during the operation.

According to an embodiment herein, the device further comprises a digital pressure sensor located at the top of the gas tank and configured for informing/indicating or notifying the remaining gas volume in the device to the user by determining/estimating the pressure level of the liquid gas.

According to an embodiment herein, the device further comprises a regulator and a programmable valve control along with digital pressure sensor configured for allowing the user to control the gas flow remotely via computing device of the user.

According to an embodiment herein, the device further comprises four wheels fixed at the bottom surface of the base and configured for moving/transporting the patio heater device freely in multiple directions to a desired location. The wheels comprise a breaking system with breaking pads for positioning the patio heater device at one/given/desired location.

According to an embodiment herein, the set of electronic devices deriving power from the one or more batteries charged through central processing system include one or more pre-programmed LED lights affixed on the post for decoration, and reading lights for reading purpose. The intensity of the LED lights and reading lights are controlled by the user using a dimmer knob affixed on the post.

According to an embodiment herein, the device further comprises a wireless communication board deployed within the central processing system and configured for allowing the user to control the operation of the set of electronic devices remotely through the computing device of the user.

According to an embodiment herein, the device further comprises one or more power outlets configured for providing power to one or more electronic devices of the user positioned externally. The electronic devices include smartphones, tablets, laptops, music players and the like. The power is provided from the one or more batteries charged through the central processing system.

According to an embodiment herein, the device further comprises a wireless speaker deployed as an electronic device deriving power from the central processing system and configured for playing music based on a request received from the user. The wireless speaker is further configured for allowing the user to broadcast the music to a single patio heater device or to a network of patio heater devices.

According to an embodiment herein, the central processing system is further configured for holding the patio heater device in standby or shut-off mode after being used for pre-defined time duration for increasing the device efficiency. The pre-defined time duration is configurable by the user through the computing device.

According to an embodiment herein, the device further comprises a proximity/motion sensor attached to the post and configured for detecting the proximity of the user near the patio heater device and for restarting the patio heater device from standby or shutoff mode upon detecting a presence of a user.

According to an embodiment herein, the device further comprises a smart food ordering kiosk with a touch screen pad for viewing the restaurant's menu and for ordering food or drinks electronically.

According to an embodiment herein, the device further comprises hosting a software application on the computing device of the user for controlling the operation of a single or multiple smart patio heater devices individually or collectively via a network.

According to an embodiment herein, the smart patio heater device is further configured for installing on or retrofit with the existing patio heater devices for providing additional features/functions offered by the smart patio heater when installed on the existing patio devices.

According to an embodiment herein, the device further comprises a set of solar panels located at the top and bottom part of the smart patio heater device for providing supplemental power for charging the one or more batteries.

According to an embodiment herein, the device further comprises a fan assembly placed near the top of the patio heater device, deriving power from the one or more batteries and controlled by the CPS for blowing the heated or cooled air to the user. The fan assembly comprises an additional fan located at the bottom of the patio heater device configured for acting as an additional heat source for blowing the heat from the radiator in downward and upward directions towards the user's feet.

According to an embodiment herein, the device further comprises one or more thermoelectric cooler (TEC) units configured for generating temperature gradient upon applying differential current across the TEC units. The cooler front of the temperature gradient is configured for cooling the water within the water pipe. The cold water is passed through a high pressure nozzle for generating cold mist that is mixed with air and is blown out to the user through the fan assembly. A small amount of cooled air is pulled back into the system causing a positive feedback loop generating increased cold air.

According to an embodiment herein, the device further comprises a liquid propane power generator configured for acting as a backup power source. The power generator charges the one or more batteries to a specific level when the residual battery charge reduces/falls below a specified threshold.

FIG. 1 illustrates a perspective view of the smart patio heater device, according to one embodiment herein. The device comprises a base 102, a chamber 104 vertically extending from the base 102, a post 106, a burning area 108 and a safety hood 110. The chamber 104 comprises one or more gas tanks 112, water pipe 114, water storage unit 116, pressure sensor 118, control valve 120, regulator 122, one or more batteries 124 and a communication board 126. The post 106 comprises LED lights 128. The burning area comprises TEG (thermoelectric generator) units 130, control switch 132, pilot 134 and an igniter 136.

According to an embodiment herein, the one or more gas tanks 112 placed within the chamber 104 supply gas for generating heat by burning the gas at the burning area 108 situated over the post 106 extending from the chamber 104. The burning area 108 dissipates the generated heat in all directions or to a specific area as desired by the user. The dissipation of the generated heat in a specific area desired by the user is controlled by blocking the output of gas to the area where heat is not desired. The blocking of the output gas is controlled by a control switch 132 attached to the post.

According to an embodiment herein, a pressure sensor 118 is located at the top of the gas tank 112 for determining the pressure level of the liquid gas stored in the gas tank placed at the bottom of the device. A pilot 134, igniter 136, gas sensors (not shown), and a control switch 132 placed near the gas burner are provided for controlling the operation of the device. In one embodiment flame sensor (not shown) and temperature sensors (not shown) are deployed on the top of device and around the TEG unit 130 to detect the temperature around the TEG unit 130 and alert the user in order to avoid overheating during the operation. A gas pipe extending from the pilot 134 is connected to the propane storage at the base of the device via servo gas flow control. The pressure sensor 118 located at the top of gas tank 112 along with the regulator (not shown) and the programmable control valve 120 enables a user to control the gas flow remotely.

According to an embodiment herein, the one or more thermoelectric generator (TEG) units 130 affixed over the burning area 108 generate electric power from the heat generated by burning the gas. The generated electric power is provided to a central processing system (not shown) situated within the chamber 104 to store the generated electric power using one or more batteries 124 for later use.

According to an embodiment herein, a water pipe 114 is encircled around the chamber 104 from within, passing through the post 106, and connected to a water storage unit 116 available within the chamber 104 at one end and the TEG unit 130 at the another end. The water pipe 114 is positioned or embedded around, inside, and behind the entire surface of the base 102. Cold water from the water storage unit 116 is circulated inside the water pipe 114. This cold water circulating within the water pipe 114 absorbs the excess heat generated around the TEG unit 130 and avoids overheating. The heated water circulating through the water pipe 114 further dissipates the heat evenly across the surface area of the patio heater device 100 which in turn offers additional warmth to the user sitting next to the device. The TEG unit 130 is additionally accompanied by a radiator (not shown) or a heat-sink to disperse and cool off the TEG unit 130 from overheating during the operation. Thus the patio heater device of the invention comprises three heating sources for providing heat across the surface of the device. These heating sources include, infrared heating source located at the burning area 108, intermediate heating source with controllable blowing fan located on the post 106 and a bottom heating source located at the base 102.

According to an embodiment herein, the one or more batteries 124 charged using the electric power generated from the TEG unit 130 are used for powering a set of electronic devices to provide additional functionality to the user. The set of electronic devices deriving power from the one or more batteries 124 charged via central processing system include one or more pre-programmed LED lights 128 affixed on the post 106 for decoration and reading lights (not shown) for reading purpose.

According to an embodiment herein, a wireless communication board 126 is housed inside the base 102 of the smart patio heater device 100 for allowing the user to control the operation of the set of electronic devices remotely through the computing device of the user. The wireless communication board 126 acts as a bridge between the set of electronic devices and the control application on the smart phones of the users. This wireless communication board 126 uses wireless technology for communication such as Bluetooth, wifi and the like.

According to an embodiment herein, one or more power outlets such as 110 v/USB power outlets are provided in the device for supplying electricity to one or more external electronic devices of the user such as smartphones, tablets, laptops, music players and the like. The electricity is provided from the one or more batteries charged via the central processing system. In one example embodiment, minimum two USB charging slots are provided at the base 102 of the device for the users.

According to an embodiment herein, a Bluetooth wireless speaker is deployed as an electronic device deriving power from the central processing system for playing music on receiving a request from the user. The wireless speaker allows the user to broadcast the music to a single patio heater device or to a network of patio heater devices.

According to an embodiment herein, the central processing system is configured for holding the patio heater device 100 in standby or shutoff mode after being used for predefined time duration for increasing the device efficiency. The pre-defined time duration is configurable by the user through the computing device.

According to an embodiment herein, a food ordering kiosk with a touch screen pad is attached to the device 100 for viewing the restaurant's menu and for ordering food or drinks electronically. Further, as the orders are placed electronically by the user themselves, the chances of wrong order being noted are reduced. An establishment or restaurant accepts and fulfills the orders from users electronically by synchronizing the smart patio heater device with the restaurants or establishments computer system and network. The touch screen pad also enables the establishment or restaurant to submit a bill to the users for payment. The user in return uses the touch screen pad for debit or credit card payment electronically on choosing such method for settling the bill amount. This benefits the restaurants by saving on manpower dedicated for taking orders, generating bills, receiving payments and the like.

According to an embodiment herein, a software application is hosted on the computing device of the user for controlling the operation of a single or multiple smart patio heater devices individually or collectively via a network. The operator of single or multiple smart patio heaters have the ability to control all heaters by synchronization of the devices with a server or through the software application already downloaded on the computing device. The wireless communication board 126 provides the main central command of the device network remotely and is configured to reset or shutoff the entire network wirelessly unless the operator chooses to control each device in the network manually.

According to an embodiment herein, the smart patio heater device is configured for installation on existing patio heater devices and for providing features offered by the smart patio heater when installed on existing patio devices. The conventional patio heater converts the heat from burning gas into electric power when the TEG unit along with radiator is located at the safety hood and/or top section of the conventional patio heater where heat is produced.

According to an embodiment herein, a fan assembly is placed near the top of the patio heater device, deriving power from the one or more batteries 124 and controlled by the CPS for blowing the heated or cooled air to the user in addition to the ambient heat generated elsewhere. The fan assembly comprises an additional fan located at the bottom of the patio heater device configured for blowing the heat from the radiator downward and outward towards the user's feet acting as an additional heat source.

According to an embodiment herein, one or more status lights (not shown) are provided on the surface of the patio heater device 100 for providing critical information to the user such as low gas, low battery or gas leakage.

Figure 2:
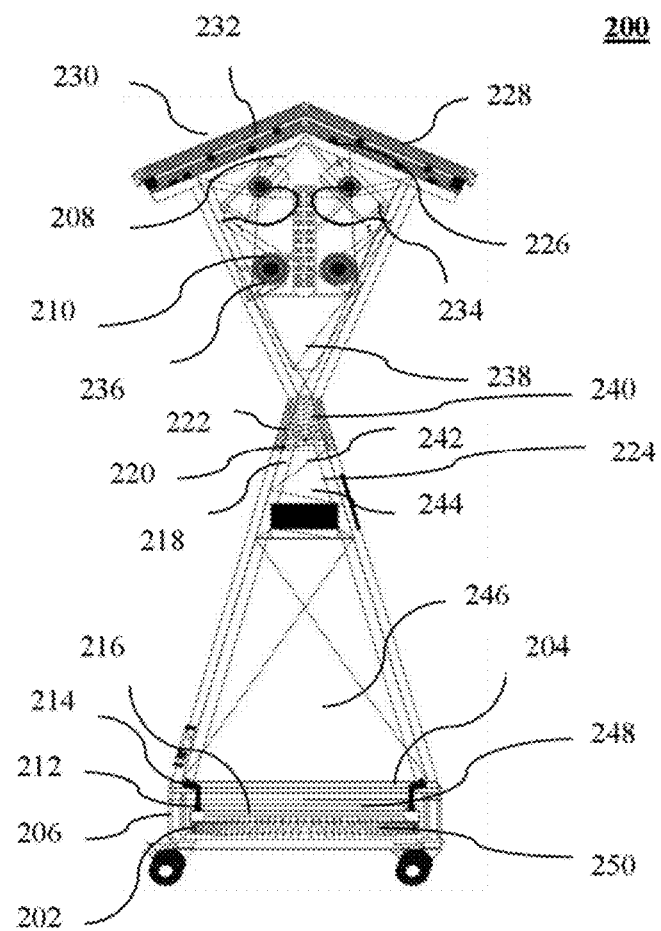
FIG. 2 illustrates a cross sectional view of the smart patio heater device, according to one embodiment herein.

FIG. 2 illustrates a cross sectional view of the smart patio heater device, according to one embodiment herein. With respect to FIG. 2, the internal structure of the smart patio heater device along with placement of various parts is shown. As illustrated, a radiator 202 is attached to the water storage unit 116 placed at the base 102 of the device for dissipating the generated heat. A water/liquid inlet to the radiator 204 is provided at the base for supplying water for circulation through the water pipes using water circulation pump 206. The three sources that provide heat in the patio heater device are shown as first infrared heat source 208, second heat source outlet 210 and third feet heat source outlet 212.

According to an embodiment herein, the patio heater comprises a water outlet to TEG 214, DC to AC inverter 216 placed at the base of the device powering the AC devices from the power stored in the batteries, USB outlets 218, audio speakers 220, gas pressure sensors 222, built in display 224, flame sensors 226 and temperature sensors 228 placed at the top as well as bottom of the device. The device further comprises water proof lid 230, air suction gap 232, infrared burner 234, cross flow fan blower 236 for blowing hot or cold air, high power dimmable LED lights 238 and proximity sensors 240. An emergency shutdown button 242 and a servo controlled gas valve/gas pressure regulator 244 is also provided in the patio heater device. Emergency shutdown button is used for instant shutdown of the device in case of emergency situations. The servo controlled gas value is used for controlling the gas flow and helps in regulating the flame size. Liquid propane generator 246, wireless communication board 248 and motor drivers 250 are also shown.

Figure 3:
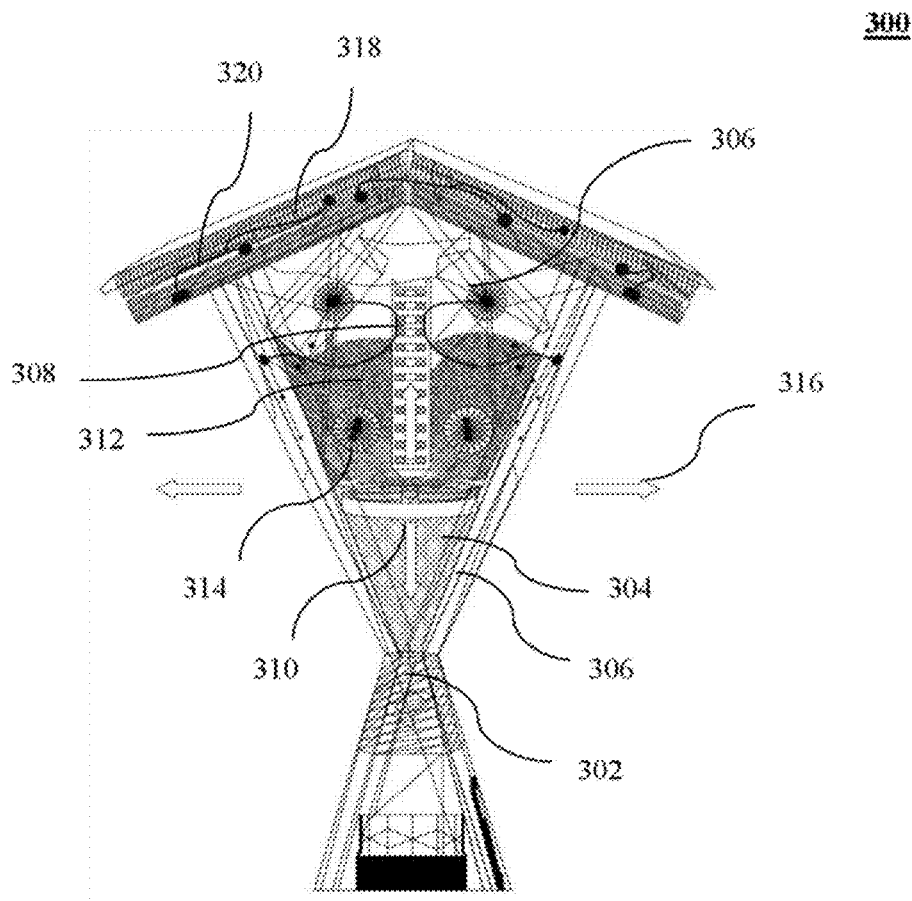
FIG. 3 illustrates a cross sectional view of the top portion of the smart patio heater device, according to one embodiment herein.

FIG. 3 illustrates a detailed cross sectional view of the top portion of the smart patio heater device, according to one embodiment herein. With respect to FIG. 3, one or more thermoelectric cooler (TEC) units (not shown) are used for providing cold air to the user during hot weather conditions. These TEC units generate a temperature gradient upon applying differential current across the TEC units. The cooler front of this temperature gradient cools off the water within the water pipe. This cold water is then passed through a high pressure misting nozzle 302 for generating mist 304 into the misting tank 306. This mist is blown into the evaporative water block 308 by means of a small fan 310 which is part of the fan assembly and the resulting cold air (super cold mist) 312 is then blown out to the user using cross flow fan blowers 314. Further, a small amount of this cooled air is pulled back into the device and the process is repeated causing a positive feedback loop generated for increasing the cold air. The process of fan 310 pushing the mist 304 to evaporation block 308 is as illustrated in the figure. The super cooled mist 312 is blown out to the user as depicted using arrows 316. The high temperature thermal insulation 318 and ambient air gap inlet 320 is provided in the safety hood of the device.

Figure 4:
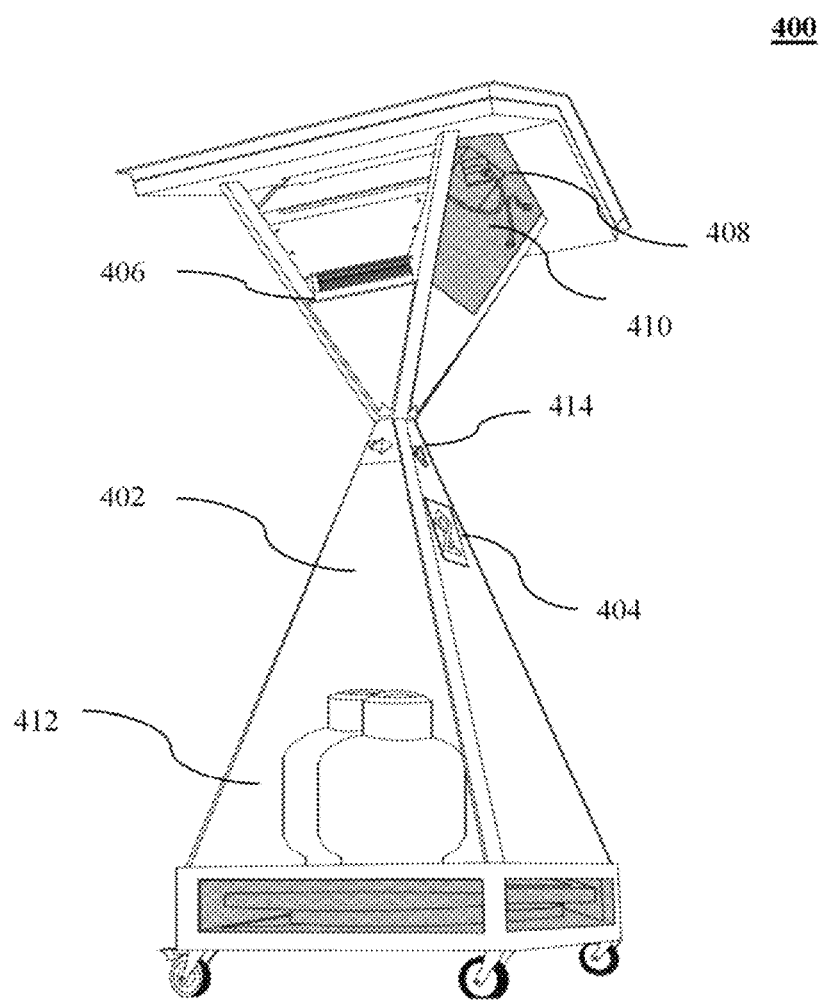
FIG. 4 illustrates a side perspective view of the smart patio heater device, according to one embodiment herein.

FIG. 4 illustrates a side view of the smart patio heater device, according to one embodiment herein. With respect to FIG. 4, the solar panels 402 are mounted on the outer surface of the device for providing additional power supply. The installation of these solar panels 402 allow for operation of the device without any other power source and enable the user to perform several operations such as setup, maintenance, or other testing without the need for a primary power source. A monitor 404 is also placed on the outer surface of the device that is used by the users for placing orders for food and billing. A fan 406 is placed for blowing hot or cold air to the user.

According to an embodiment herein, an infrared burner 408 is used. The infrared burner 408 uses infrared technology as a heat source. In conventional patio heaters the flame heats the grates directly whereas in the infrared burner an infrared element is used between the grates and the flame to reduce the risk of fire and to increase the device efficiency.

According to an embodiment herein, a gas detector sensor 410 is attached to the device. The gas detector sensor 410 detects concentration of harmful gases such as methane produced as a result of burning and warns user if the level exceed a threshold limit. In another example embodiment the gas detector sensor 410 detects the leakage of un-burnt gas due to flame being doused and warns user about the same. The placement of other parts depicted is same as explained with respect to FIG. 1 above such as one or more batteries 124 and igniter 136.

According to an embodiment herein, a liquid propane power generator 412 is provided at the base 102 of the device. This liquid propane power generator 412 acts as a backup power source for charging the one or more batteries 124 to a specific level upon the drop of the battery charge below a specified threshold. The liquid propane power generator 412 is configured to operate automatically or manually as preferred by the user.

According to an embodiment herein, a proximity/motion sensor 414 is attached to the post 106 for detecting the proximity of the user near the patio heater device and for restarting the patio heater device from standby or shutoff mode upon detecting user presence. These sensors are programmable via central processing system (CPS) for determining if the smart patio heater has been in use for pre-defined time duration (e.g. 10-15 minutes) before turning the entire device on, standby, or shutoff modes. The motion/proximity sensors 414 automatically turn the device on again once motion of the user is detected in the vicinity of the sensors. These sensors ensure safety during the operation of the smart patio heater to prevent fire as well as saves on gas from unnecessary burning.

Figure 5:
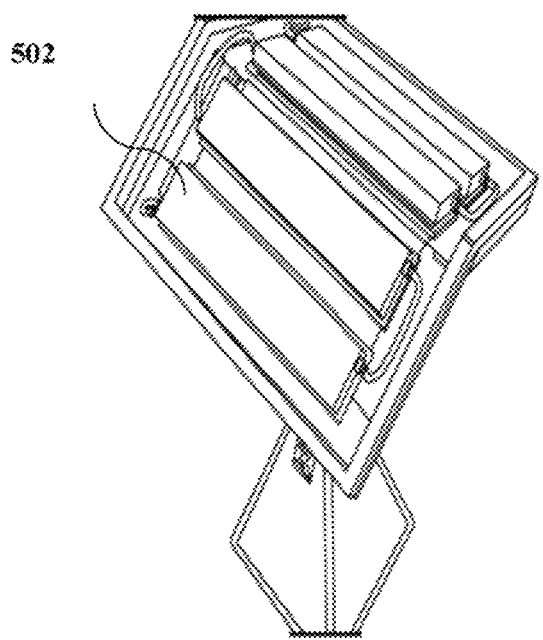
FIG. 5 illustrates a top view of the smart patio heater device, according to one embodiment herein.

FIG. 5 illustrates a top view of the smart patio heater device, according to one embodiment herein. With respect to FIG. 5, radiator fans (rad fan) 502 are placed on the top surface (safety hood) of the patio heater device. The rad fans 502 are used for increasing the warm air flow and putting the warmth in the area desired by the user.

Figure 6:
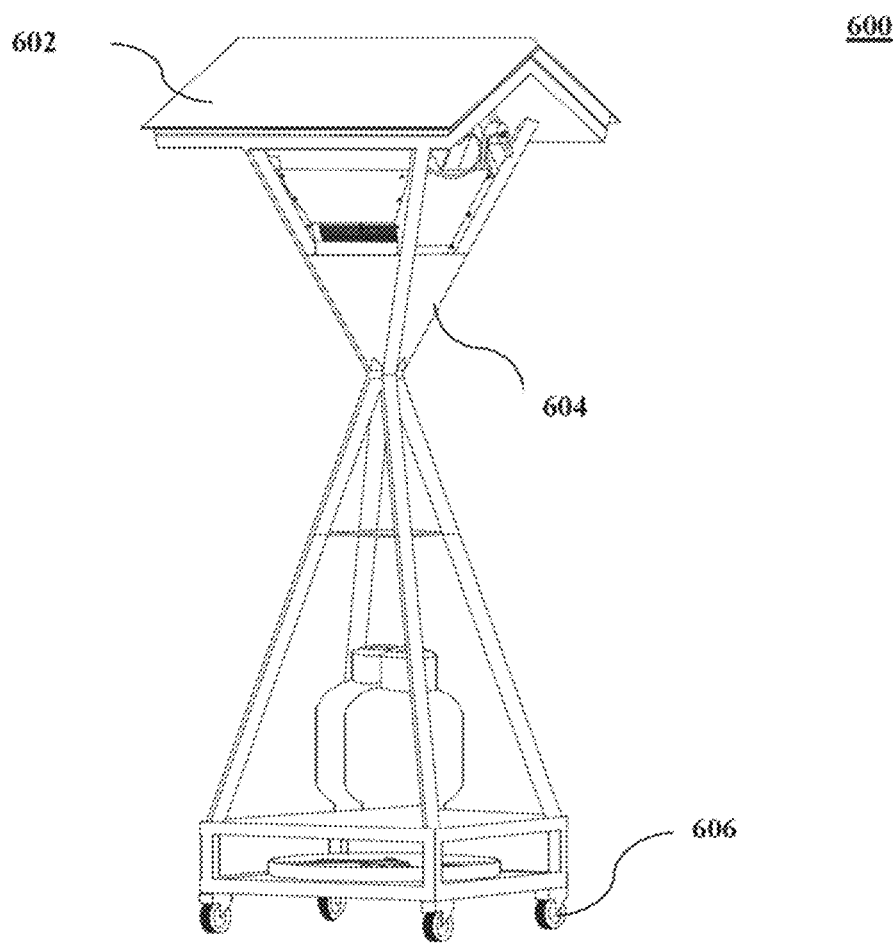
FIG. 6 illustrates a side perspective view of the smart patio heater device, according to one embodiment herein.

FIG. 6 illustrates a yet another side view of the smart patio heater device, according to one embodiment herein. With respect to FIG. 6, the safety hood 602 allows the patio heater device to be placed outdoor even during rains or snow. The safety hood 602 comprises a water proof lid and an air suction cap. The safety hood 602 acts as a protective cover and avoid rain drops or water from entering the burning area and thereby avoiding dousing off of the flame for keeping the device operational. The safety hood 602 also acts as a protective cover for the one or more electronic devices being part of the smart patio heater device and avoids rain drops or water coming in contact directly with the electronic devices. The reading lights 604 are mounted on the outer surface of the device. The reading lights 604 provide an ambient light around the device for reading or other related activities. The intensity of these reading lights 604 is controlled by the user using a dimmer knob.

According to an embodiment herein, the device 600 further comprises four wheels 606 at bottom of the base and configured for allowing the patio heater device to be moved freely in multiple directions and transferred at a desired location. The wheels comprise a breaking system (not shown) with breaking pads allowing the patio heater device to be secured at one location.

Figure 7A:
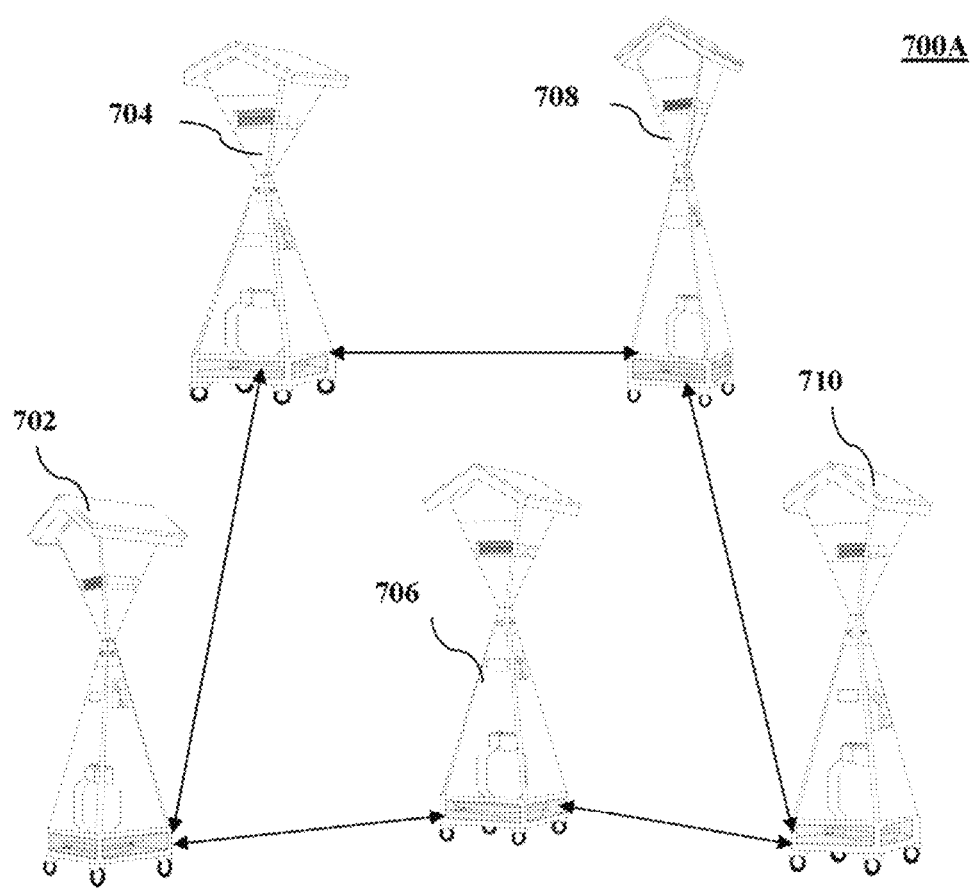
FIG. 7A illustrates a network of plurality of smart patio heater devices, according to one embodiment herein.

FIG. 7A illustrates a network of plurality of smart patio heater devices, according to one embodiment herein. With respect to FIG. 7A, plurality of patio heater devices 702A-710A are connected in a network for larger outdoor facilities such as restaurants. The operation of these devices in the network is controlled by the user either collectively or individually as desired.

Figure 7B:
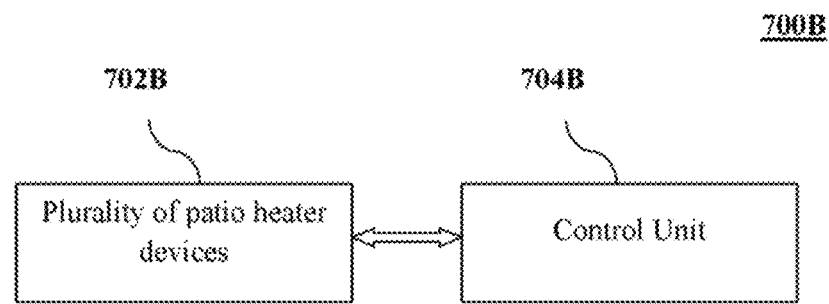
FIG. 7B illustrates block diagram of a control system for controlling a network of plurality of smart patio heater devices, according to one embodiment herein.

FIG. 7B illustrates block diagram of a control system for controlling a network of plurality of smart patio heater devices, according to one embodiment herein. With respect to FIG. 7B, the operation of the plurality of patio heater devices 702B connected in a network for larger outdoor facilities such as restaurants are controlled using a control unit 704B. The centralized control unit enables the operator to control the operations of all the connected patio heater devices together for example turning on or off of all the devices and the like. In one example embodiment, the control unit 704B comprises a software application hosted on a computing device of the user.

Figure 8:
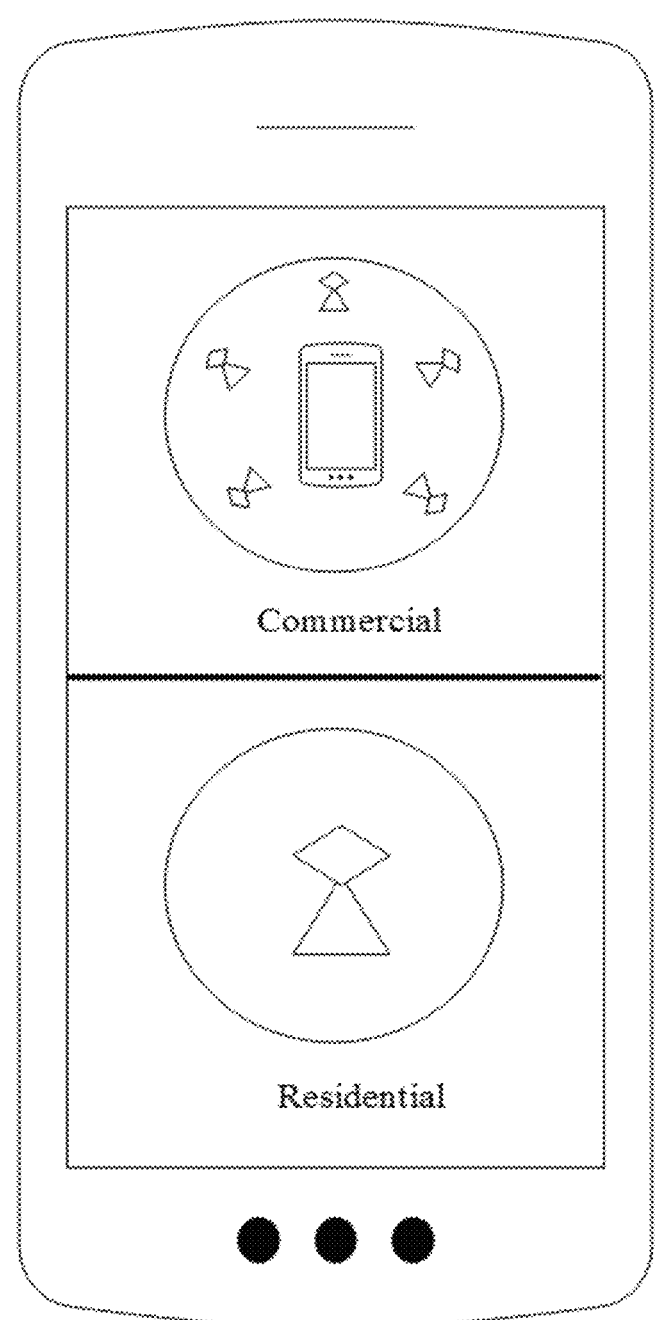
FIG. 8 illustrates a screen shot of the mobile application hosted on the computing device of the user for controlling the smart patio heater devices, according to one embodiment herein.

The FIG. 8 show a screen shot of the software application hosted on the smart phone of the user. The software application is downloaded on a smart phone or server for single or multiple smart patio heaters in order to control the device individually or collectively via a network for places like restaurants, events, or a large area where multiple patio heaters are required. The operator of single or multiple smart patio heaters have the ability to control all heaters by synchronization of each device with a server or the software application already downloaded on the smart phone. The operator is also allowed to control a single unit remotely or manually. However, the wireless communication board is the main central command of the electronic system remotely and resets or shuts off the entire device network wirelessly unless the operator chooses to control manually. In one example embodiment, the height of residential smart patio heater device is 6.5 feet and that of commercial device is 8 feet.

Figure 9:
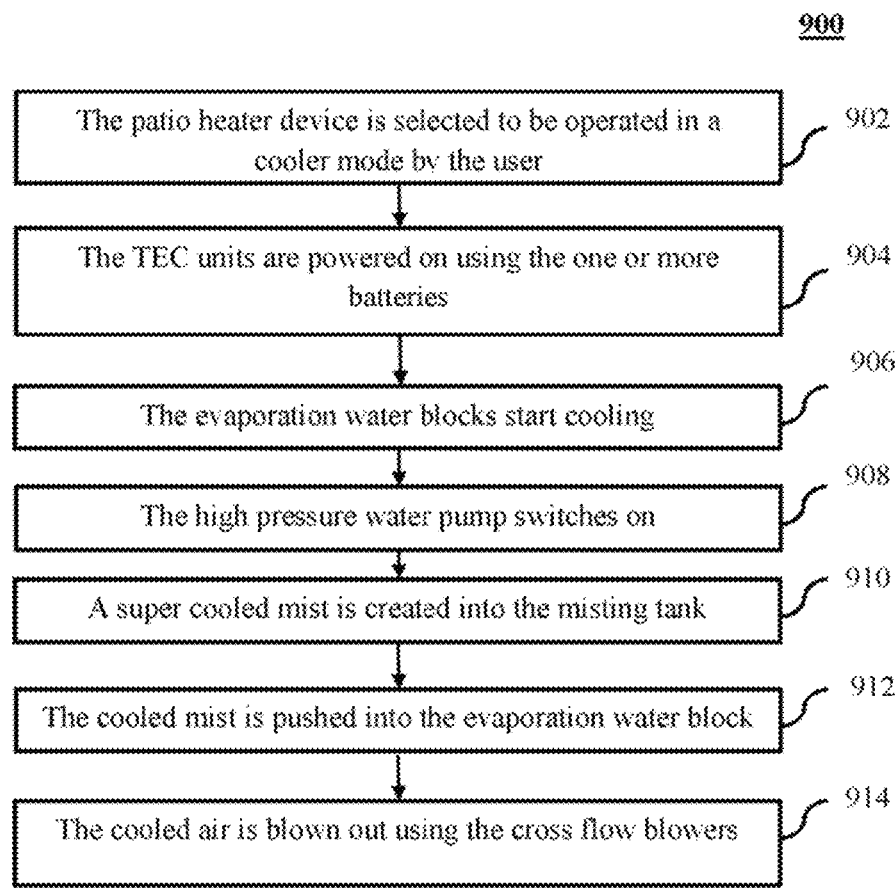
FIG. 9 illustrates a flowchart explaining a method of operating the smart patio heater device as a cooler, according to one embodiment herein.

FIG. 9 illustrates a flowchart explaining a method of operating the smart patio heater device as a cooler, according to one embodiment herein. With respect to FIG. 9, the patio heater is selected to be operated in a cooler mode by the user (902). The TEC units are powered on using the one or more batteries (904). In case when the one or more batteries are not charged then the liquid propane generator automatically turns on for providing necessary power for the operation. When the one or more batteries are fully charged then the liquid propane generator automatically turns off and the batteries are used for the operation. As explained earlier, the evaporation water blocks start cooling (906). The high pressure water pump switches on (908). A super cooled mist is created into the misting tank (910). This cooled mist is then pushed into the evaporation water block (912). The cooled air is then blown out using the cross flow blowers (914).

Figure 10:
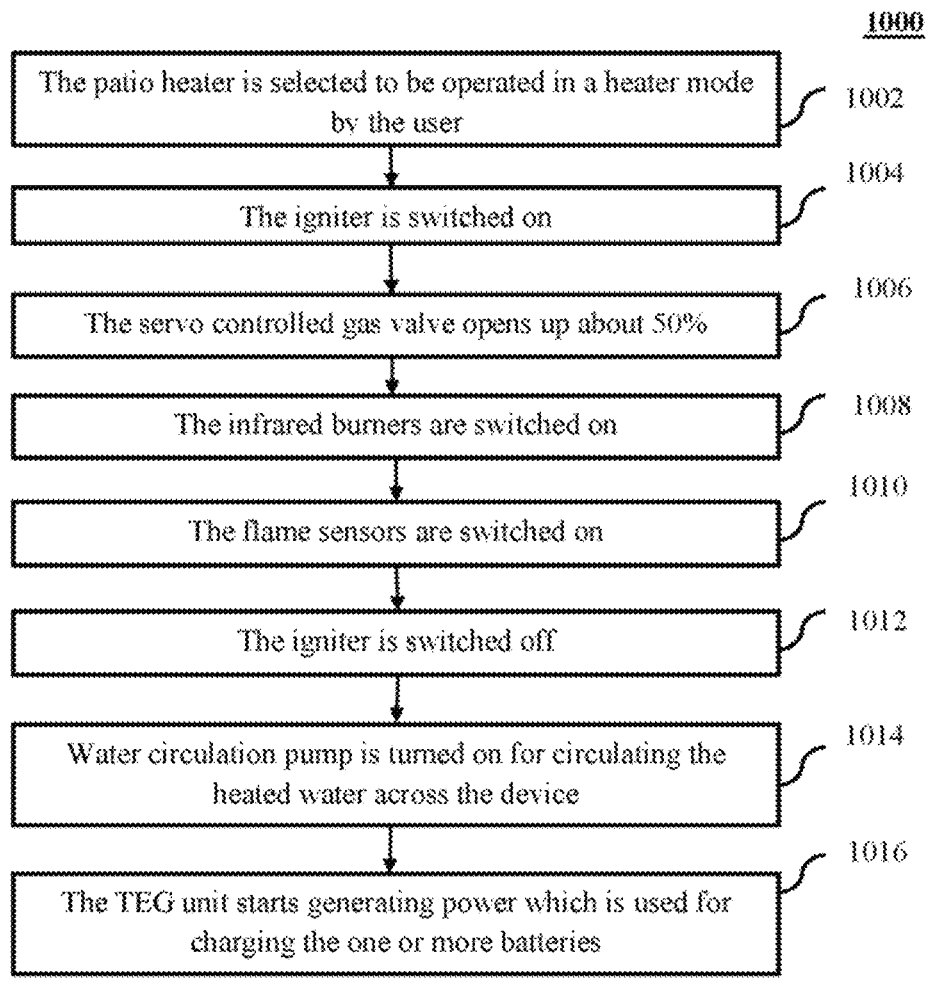
FIG. 10 illustrates a flowchart explaining a method of operating the smart patio heater device as a heater, according to one embodiment herein.

FIG. 10 illustrates a flow chart explaining a method of operating the smart patio heater device as a heater, according to one embodiment herein. With respect to FIG. 10, the patio heater device is operated in the heater mode (1002). The igniter is switched on (1004). The servo controlled gas valve opens about 50% (1006). The infrared burners are switched on (1008). Further, the flame sensors are also switched on (1010). The igniter is then switched off (1012). Water circulation pump is then turned on (1014) for circulating the heated water across the device. The TEG unit starts generating power which is further used for charging the one or more batteries (1016).

Therefore, the smart patio heater device of the invention is capable of providing heat in all directions or to a specific area desired by users as compared to conventional patio heaters which provides heat in all directions thus reducing the efficiency of the device. Another important advantage provided by the smart patio heater device includes reduction in the fuel consumption by turning on the device only on detecting user presence in the vicinity of the device. The device is configured to act as a heater using TEG unit or cooler using TEC unit depending on user requirement. Several devices can be connected in a network and the operation of all the devices can be controlled individually or together either manually or through a software application hosted on the computing device of the user.

The embodiments herein enhance the conventional patio heaters by mounting the smart patio heater of the proposed invention on top of existing devices. Thus, providing all the features of the smart patio heater device. The smart patio heater helps to charge batteries which are further used for driving several other electronic devices such as LED lights, reading lights, food ordering kiosk, Bluetooth speaker for music and the like. The device further provides several USB charging ports which are used for charging mobile phones, tablets, laptops etc.

Some other advantages provided by the proposed invention include solar panels for charging the batteries, use of infrared burner, gas detector sensor, temperature sensor, flame sensor and the like. The safety hood provided in the device enables placing the device outdoors even during extreme weather conditions such as heavy rains or snow.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A smart patio heater device, comprising:
a base having a vertically extended chamber configured for receiving a gas from a gas tank for supplying a gas for generating heat by burning the gas at a burning area situated over a post extended from the chamber, and wherein the burning area is configured for dissipating the generated heat in all directions or to a specific area desired by the user;
one or more thermoelectric generator (TEG) units affixed over the burning area and configured for generating electric power from the heat generated by burning the gas, and wherein the generated electric power is provided to a central processing system situated within the chamber to store the generated electric power in one or more batteries for later use;
a water pipe encircled around the chamber from within, and wherein the water pipe is passed through the post and connected to a water storage unit, and wherein the water storage unit is arranged within the chamber, and wherein the water pipe is connected to the water storage unit at the one end and to the TEG unit at another end, and wherein the water is circulated within the water pipe to absorb an excess heat generated around the TEG unit to prevent an overheating of TEG unit, and wherein the heated water is circulated through the water pipe to dissipate heat evenly across the surface area of the patio heater device for offering additional warmth to the user sitting next to the device; and
a set of electronic devices configured to derive electrical power from the one or more batteries and configured for providing additional functionality to the user, and wherein the one or more batteries are charged through the central processing system.

2. The device according to claim 1 further comprises a control switch attached to the post to control and regulate a dissipation of the heat generated in a specific area desired by the user by blocking an output of the gas to an unwanted area where the heat is not desired.

3. The device according to claim 1 further comprises a radiator coupled to the TEG unit and configured for dispersing heat from and cooling off the TEG unit from overheating during operation.

4. The device according to claim 1 further comprises a digital pressure sensor located at the top of the gas tank, and wherein the digital pressure sensor is configured for notifying or indicating a remaining gas volume in the gas tank to the user based on detected pressure level of the gas.

5. The device according to claim 1 further comprises a regulator and a programmable control valve fitted with digital pressure sensor configured for allowing the user to control the gas flow remotely through a computing device of the user.

6. The device according to claim 1 further comprises four wheels attached at bottom of the base and wherein the four wheels are configured for moving in multiple directions to a desired location, and wherein the wheels comprise a breaking system with breaking pads for positioning the patio heater device at a given location.

7. The device according to claim 1, wherein the set of electronic devices include one or more pre-programmed LED lamps affixed on the post for decoration and reading purpose, and wherein the one or more LED lamps include a decorative LED lamp and a reading lamp, and wherein an intensity of the decorative LED lamp and reading LED lamp are controlled by the user through a dimmer knob affixed on the post.

8. The device according to claim 1 further comprises a wireless communication board deployed within the central processing system and configured for controlling the operation of the set of electronic devices remotely through the computing device of the user.

9. The device according to claim 1 further comprises one or more electrical power outlets configured for providing power to one or more external electronic devices, and wherein the one or more external electronic devices include smartphones, tablets, laptops, music players; wherein the electrical power is supplied from the one or more batteries charged through the central processing system.

10. The device according to claim 1 further comprises a Bluetooth wireless speaker configured to derive electrical power from the central processing system and configured for playing music based on a request received from the user, and wherein the Bluetooth wireless speaker is further configured to broadcast the music to a single patio heater device or to a network of patio heater devices based on a request received from the user.

11. The device according to claim 1, wherein the central processing system is further configured to operate the patio heater device in standby mode or shutoff mode after an operation for pre-defined time for increasing the device efficiency, and wherein the pre-defined time duration is set by the user through the computing device.

12. The device according to claim 1 further comprises a proximity/motion sensor attached to the post and wherein the proximity/motion sensor is configured for detecting the proximity of the user near the patio heater device and for restarting the patio heater device from standby or shutoff mode upon detecting a presence of a user.

13. The device according to claim 1 further comprises a smart food ordering kiosk with a touch screen pad for viewing a menu of a restaurant in which the heater device is provided and for ordering food or drinks electronically.

14. The device according to claim 1, further comprises a software application hosted or installed on the computing device of the user for controlling a operation of a single or multiple smart patio heater devices individually or collectively through a network.

15. The device according to claim 1, wherein the device is configured for installation on existing patio heater devices for providing features offered by the smart patio heater.

16. The device according to claim 1, further comprises a set of solar panels located at a top portion and a bottom portion of the smart patio heater device for providing supplemental power for charging the one or more batteries.

17. The device according to claim 1, further comprises a fan assembly placed near the top portion of the patio heater device, and wherein the fan assembly is configured to derive an electrical power from the one or more batteries and controlled by the CPS for blowing the heated or cooled air to the user, and wherein the fan assembly comprises an additional fan located at the bottom of the patio heater device and wherein the additional fan is configured to act as an additional heat source for blowing the heat from the radiator in downward direction and upward direction towards a feet of the user.

18. The device according to claim 1, further comprises one or more thermoelectric cooler (TEC) units configured for generating temperature gradient upon applying differential current across the TEC units, and wherein the temperature gradient at a cooler front is configured for cooling the water within the water pipe, and wherein the cold water is passed through a high pressure nozzle for generating cold mist, and wherein the generated cold mist is mixed with air and blown out to the user through the fan assembly.

19. The device according to claim 1, further comprises a liquid propane power generator configured for acting as a backup power source, and wherein the power generator is configured to charge the one or more batteries to a specific level when a residual level of the battery charge falls or decreases below a specified threshold value.

* * * * *